(12) United States Patent
Normile et al.

(10) Patent No.: US 11,524,449 B2
(45) Date of Patent: Dec. 13, 2022

(54) METHOD FOR PREPARING A SURFACE FOR EXTRUSION DEPOSITION MODELING

(71) Applicant: Titan Additive LLC, Colorado Springs, CO (US)

(72) Inventors: Christopher Normile, Colorado Springs, CO (US); Daniel Inman, Colorado Springs, CO (US); Clay Guillory, Colorado Springs, CO (US)

(73) Assignee: 3D SYSTEMS, INC., Rock Hill, SC (US)

( * ) Notice: Subject to any disclaimer, the term of this patent is extended or adjusted under 35 U.S.C. 154(b) by 107 days.

(21) Appl. No.: 16/695,530

(22) Filed: Nov. 26, 2019

(65) Prior Publication Data

US 2020/0238602 A1    Jul. 30, 2020

Related U.S. Application Data

(60) Provisional application No. 62/771,931, filed on Nov. 27, 2018.

(51) Int. Cl.
| | |
|---|---|
| *B29C 64/118* | (2017.01) |
| *B29C 64/245* | (2017.01) |
| *B29C 64/364* | (2017.01) |
| *B33Y 40/20* | (2020.01) |
| *B33Y 10/00* | (2015.01) |

(52) U.S. Cl.
CPC .......... *B29C 64/118* (2017.08); *B29C 64/245* (2017.08); *B29C 64/364* (2017.08); *B33Y 10/00* (2014.12); *B33Y 40/20* (2020.01)

(58) Field of Classification Search
CPC ..... B29C 64/245; B29C 64/205; B29C 64/40; B29C 64/188; B33Y 30/00; B33Y 40/00
See application file for complete search history.

(56) References Cited

U.S. PATENT DOCUMENTS

| | | | | |
|---|---|---|---|---|
| 2017/0282461 | A1* | 10/2017 | Susnjara | B29C 64/118 |
| 2018/0065310 | A1* | 3/2018 | Hodgdon | B29C 64/393 |
| 2018/0272561 | A1* | 9/2018 | Kasperchik | B33Y 30/00 |
| 2020/0306869 | A1* | 10/2020 | Hardwick | B33Y 10/00 |
| 2021/0387422 | A1* | 12/2021 | Liu | B29C 64/40 |

FOREIGN PATENT DOCUMENTS

WO   WO-2015149054 A1 * 10/2015   ......... B33Y 40/00

* cited by examiner

*Primary Examiner* — Leith S Shafi
*Assistant Examiner* — Xinwen Ye

(57) ABSTRACT

In the context of an extrusion deposition modeling to form three-dimensional objects, adhesion of extruded materials to a build surface is achieved by preparing the build surface using an intermediary coating that substantially adheres to the build surface, and a bondable particulate material, applied to the intermediary coating, that becomes affixed to the intermediary coating and provides a surface to which the extruded materials may attach.

18 Claims, 5 Drawing Sheets

METHOD FOR PREPARING A SURFACE FOR EXTRUSION DEPOSITION MODELING

RELATED APPLICATIONS

The present application claims the benefit of priority under 35 U.S.C. 119(e) to a provisional application filed on Nov. 27, 2018 and having application Ser. No. 62/771,931, which is incorporated by reference herein.

BACKGROUND

In accordance with one common type of 3D printing, which may be referred to as extrusion deposition modeling, a chosen thermoplastic, such as ABS, nylon or PLA, is deposited in progressive layers upon a so-called 'build surface'. The build surface often comprises a flat glass, plastic or metal plate. Whereas cohesion between layers of a given plastic is relatively easy to achieve, adhesion of the first layer of material deposited onto the dissimilar build plate surface can be more difficult to achieve but is critical to a successful print as all subsequent layers are dependent on this foundational layer. Despite a wide range of practices by manufacturers to ensure first layer adhesion, many of the otherwise desirable materials for forming objects using extrusion deposition modeling lack a suitable surface on which to initiate a build, greatly hindering their use in production.

SUMMARY

Disclosed herein is a method, in an extrusion deposition modeling process, for preparing a surface of a build plate to provide a bondable surface to a first material to be deposited onto the build plate by extrusion. The method disclosed herein comprises applying an intermediary coating to the build plate, wherein the intermediary coating substantially adheres to the build plate. The method disclosed herein further comprises bringing into contact with the intermediary coating a bondable particulate material comprising fine particles of a second material, wherein at least some of the bondable particulate material becomes affixed onto the intermediary coating. The method involves depositing, by extrusion, the first material onto the bondable particulate material in the course of constructing a solid object made from the first material and supported by the build plate. An example embodiment of the disclosed principles involves applying a concentrated sugar solution onto a build plate, followed by fine particles of polyetherimide. Extruded polyetherimide may then be deposited onto the resulting surface, even at high ambient temperatures.

BRIEF DESCRIPTION OF THE DRAWINGS

In conjunction with the detailed description that follows below, the accompanying drawings illustrate various embodiments and form a part of the specification. The illustrative embodiments are merely examples and do not limit the scope of the disclosure. Throughout the drawings, identical or similar reference numbers designate identical or similar elements.

DETAILED DESCRIPTION

Figure 1:
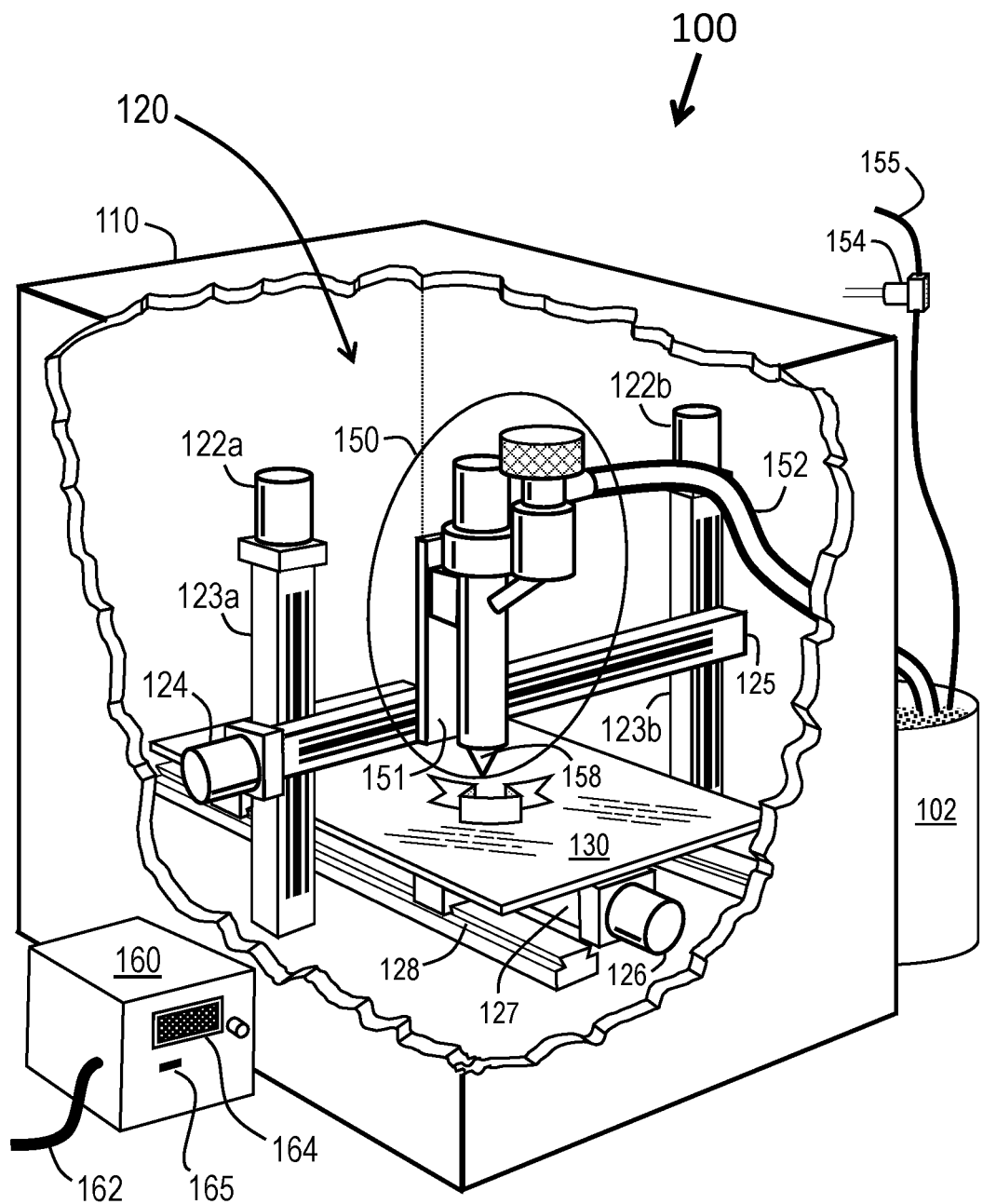
FIG. 1 is a pictorial overview of an extrusion deposition modeling system set forth as an example context wherein the present teachings may be usefully applied.

Manufacturers who utilize extrusion deposition to form 3D-printed objects are driven to employ an ever-expanding array of materials to construct finished parts having desirable characteristics such mechanical strength, solvent resistance, temperature resistance, wear resistance, etc. However, each material requires a suitable build surface—that is, one that provides adequate first layer adhesion for initiating the build yet can be readily separated from the finished piece after the build is completed.

Accordingly, a variety of techniques have been developed to promote first layer adhesion, at least for common materials such as polylactic acid (PLA), actylonitrile-butadienestyrene (ABS) and nylon. These techniques include heating the build surface or applying slightly rough or porous materials such as an adhesive-backed paper tape e.g. masking tape or so-called 'blue painter's tape'—referring to SCOTCHBLUE® product sold under 3M.)

Other techniques for promoting adhesion, especially useful for printing at room temperature or relatively low ambient temperatures, involve coating the build plate with a PVA-based glue, such as an ELMER'S™ glue stick sold under Newell Brands Inc., or with a 'slurry' prepared by dissolving ABS or the like in a volatile solvent, such as acetone or methyl ethyl ketone (MEK).

Yet another approach involves selecting a complementary plastic to serve as the build surface—one that provides adequate adhesion during printing yet can be cleanly separated from the printed workpiece upon its completion. One of the more useful printing surfaces in this category is a plastic adhesive tape such as KAPTON® sold under Interstate Group and made from a polyimide film produced by Dupont Electronics, Inc.

For example, polyetherimide (PEI) (also known as ULTEM™ sold under SABIC Global Technologies B.V.)—either in sheet form or as bonded to a sheet of another material—serves as an excellent surface on which to initiate ABS prints. The degree of adhesion can be controlled by build plate temperature.

PEI is also a good complement to ABS because, if some ABS remains after part removal and proves difficult to remove mechanically, acetone may be used to selectively dissolve the ABS without appreciably attacking the PEI surface. PEI and PEEK (polyetheretherketone) are among the few plastics that exhibit a high glass transition temperature (Tg) of over 210 Celsius and which are relatively impervious to volatile organic solvents.

Despite all of the accommodations just mentioned, some printed materials still lack an adequate build surface.

PEI itself is a prime example. Rare materials like PE that exhibit exceptional strength, solvent resistance and temperature resistance, are often chosen as a build surface upon which other, more common plastics are printed. However, because of these same desirable characteristics, manufacturers are motivated to use PEI itself as the deposited build material for some applications. High-Tg materials such as this can be extruded by shifting to comparatively high extruder temperatures, but then new challenges arise in choosing a suitable build surface material—one offering adhesion during build yet separability afterwards. This selection is further complicate by the need to run the build surface and even the entire build environment—at comparatively high temperatures (>170° C.) to promote adhesion, control shrinkage and reduce warp-inducing, stresses in the printed part. When printing with a plastic having one of the highest temperature ratings, such as PEI or PEEK, it becomes difficult to find another plastic—one that is even more tolerant of the temperatures involved—to serve as the build surface. Consequently, a build plate of metal, such as carbon steel, becomes the de facto build surface within the heated chamber. Unfortunately, this surface offers little to no adhesion for most directly applied extruded plastics.

Aside from PEI, several of the more common low-temperature materials can be particularly difficult to initiate. For example, while polyolefins, such as polyethylene and polypropylene, are extrudable candidates for an extrusion deposition process, they defy initial layer adhesion to a typical build surface.

One hurdle confronted when printing either PEI or polyolefins is that the aforementioned 'slurry' approach is inapplicable. These plastics are essentially insoluble in the common organic solvents, such as ketone group solvents (acetone, MEK, etc.) that are typically used to dissolve other polymers.

In accordance with the present teachings, first layer adhesion of difficult materials is improved by having fine particles of these same or similar materials anchored on a build surface by an intermediary coating such that any subsequent extrusion atop the particles will adhere by fusion and cohesion among like materials. After a build process is complete, part removal from the build surface is achieved mainly by breaking or dissolving or otherwise overcoming the hold of the intermediary coating. Further description as to the nature of this intermediary coating, along with an example composition and method of preparation, is set forth below.

Before elaborating further on build plate surface preparation to address first layer adhesion, FIG. 1 will be described to provide a better understanding of the general context within which the present teachings may be particularly useful.

FIG. 1 depicts an enclosed extrusion deposition modeling system 100. System 100 is shown to comprise a motor driven multi-axis motion control system 120 which controllably moves extruder head 150 relative to build plate 130. The motion control componentry combined with extruder head 150 constitute an extrusion deposition modeling system, that is, a form of 3D printer. Multi-axis motion control system 120 as shown creates movement along three orthogonal axes in an arrangement known as a Cartesian coordinate system wherein any point within the build space is referenced by a unique triplet of scalar values corresponding to displacement along three mutually orthogonal axes.

Extruder head 150 is shown to be attached to a carriage 151 that is controllably moved along the long axis of transverse beam 125 by the rotation of the shaft of an X-axis motor 124. Typically, beam 125 will comprise one or more linear bearings facilitating the smooth movement of carriage 151 parallel to the long axis of beam 125. Furthermore, beam 125 may house a lead screw (not distinctly visible in the diagram) which is coupled to carriage 151 by a precision nut, fixed within the beam 125 by rotary and thrust bearings and coupled to the shaft of X-axis motor 124. The rotation of the shaft of X-axis motor 124 may rotate the lead screw which, in turn, will cause carriage 151 to move closer to or further away from motor 124 in a controlled manner. X-axis motor 124 is often a stepping motor but may also be an AC or DC servo motor with a shaft position encoder and/or tachometer operating in a closed-loop control mode to facilitate moving to very precise positions. Many such arrangements of motors, lead screws, bearings and associated components are possible.

Whereas the arrangement of motor 124 and beam 125 accomplish controlled movement of the extruder head 150 in what may be termed the horizontal X-axis in the print-space coordinate system, motors 122A, 122B and their respective columns 123B, 123A may use a similar arrangement of linear guides, bearings and lead screws such that Z-axis motors 122A, 122B controllably move extruder head 150 in a vertical direction, that is, closer to or further away from build plate 130. More specifically, beam 125 may be attached to carriages (hidden) that couple to lead screws within columns 123A and 123B. As Z-axis motors 122A and 122B rotate their respective lead screws in synchrony, the entirety of beam 125, X-axis motor 124 and extruder head 150 are caused to move upward or downward.

To accomplish yet another motion of build plate 130 relative to extrusion head 150, a third motor, which may be referred to as Y-axis motor 126 may act upon a lead screw 127 to which the build plate 130 is coupled. The rotation of the shaft of motor 126 controls the position of build plate 130. Build plate 130 may be supported by, and may slide or roll along, linear bearing rails such as rail 128.

It should be understood that the arrangement of motors, bearings and such depicted in FIG. 1 is merely one example of achieving controlled relative motion between extruder head 150 and build plate 130 such that an object is formed by the extrusion of materials through nozzle 158. Various other arrangements are common and equally suitable as an embodiment in which the present invention may be applied. For example, in some arrangements, the build plate may move in two horizontal axes while the extruder head may move only vertically. Alternatively, the build plate may only move vertically while an extruder head moves in two horizontal axes. In yet other arrangements, an extruder head may be coupled to a motor driven gantry that accomplishes motion in all three axes while the build plate remain stationary. The present invention is equally applicable to a wide variety of arrangements motion control arrangements independently including those just mentioned, as well as so-called 'Core XY', 'H-bot' and 'delta' arrangements.

In addition, it should be understood that, for simplicity, FIG. 1 excludes many fasteners, brackets, cables, cable guides, sensors and myriad other components that may be employed in the manufacture of such systems but which are not essential for explaining the principles of the present invention nor for describing the best mode thereof. Where linear guides and lead screws have been described, it should be understood that the present invention is not limited to being applied to machines that use such mechanisms and that, for example, belt driven systems and gear driven systems are equally suitable for use and susceptible to the challenges that the present invention addresses.

The role of extrusion head 150 is to receive plastic in pellet form driven by bursts of air through a feed tube 152 and to melt the plastic and drive it out of the end of nozzle 158 in a continuous stream. Typically, plastic pellets are stored in a large external pellet reservoir 102 and provided to the extruder head 150 in small increments as needed. A detector (to be shown and described below) included with the extruder head 150 determines when additional pellets are needed and electrically controls the actuation of an air valve 154 which switches on a momentary burst of compressed air as provided by compressed air inlet 155.

As an alternative to pellet extruder head 150, many extruders are made to receive material in the form of a long strand or 'filament' instead of pellets. Many materials handle well in filament form and can be coiled onto spools and fed into an extruder more simply than in the pelletized form. Stiff or brittle materials are not amenable to being handled in filament form. Filament can be mechanically driven by forcefully engaging a knurled surface on a motor-driven drive wheel. The filament is generally pushed into a passage through a heated block that is approximately the same diameter as the filament. In this manner, the cooler filament entering the block from one end acts like a piston to drive molten filament material out of the other end of the heated block and through a discharge nozzle. Either type of extruder accomplishes controllable discharge of heated extrusion material from a nozzle.

To accomplish the formation of a solid object in three dimensions upon the build plate 130 from extruded materials emanating from the tip of nozzle 158, a control box 160 is provided with electronics, such as a microprocessor and motor drive circuitry, which is coupled to the X, Y and Z motors as has been described above, as well as to numerous sensors and heating elements, in the system 120, some of which will be described further below in connection with FIG. 2. Electronics within control box 160 also control an extruder motor, to be described below. Some examples of suitable control electronics which may operate within control box 160 are the RepRap-compatible Mother Board (RAMBo) sold under UltiMachine running Marlin open source firmware and so-called 'Smoothieboards' executing open-source Smoothieware firmware.

A wide variety of 3D printer control boards may be used. The primary role of such controller boards is to interpret sequential lists of positional commands, such as so-called G-code files and to output signals that drive the motors to implement the commanded movements. A G-code file, or the like, describing the coordinate movements necessary to form a particular object may be supplied to the controller through connection of the controller to a wired data communications network via, for example, TCP/IP communications through an Ethernet connection or via a wireless network connection, such as 'WiFi' or IEEE 802.11 connection. A G-code file (or a data file, such as a file in STL format from which a G-code file may be prepared) may also be supplied on a removable flash memory card, such as an SD card, which may be inserted at SD card slot 165 on control box 160.

For providing a human-accessible control interface, essentially all of the available control boards support an LCD display and user interface 164, as is shown to be a part of control box 160 in FIG. 1. The electrical power to drive the control box 160 and the motors sensors and heating elements of system 120 comes from a connection to electrical power lines 162.

Build plate 130 is preferably heated to a controlled temperature, most commonly using electrical resistance heating elements (not visible in the diagram) which may be mounted under the bed and thermally coupled thereto. For this purpose, it is common to use a heating mat made of high-temperature-rated silicone rubber that has electrically conductive paths embedded within and is adhered to the bottom of the build plate. A temperature sensor, such as a thermistor is typically included to provide feedback to a proportional-integral-derivative (PID) controller which maintains a set build plate temperature by controlling the application of heating current to the heating mat. Such elements for heating the build plate are commonplace and need not be further described here.

The temperature within enclosure 110 may be elevated over typical room ambient temperature by the addition of yet other heating elements (not shown) or simply by the heat incidentally dissipated from build plate 130. With a suitably insulated enclosure 110, heat from build plate 130 may be fully sufficient to heat the interior of the enclosure to beneficial levels by convection alone.

Within the context provided in FIG. 1, the present teachings pertain to preparing a surface of a build plate, such as build plate 130, for deposition of an extruded material. The prescribed process involves applying to the surface an intermediary coating (having characteristics described below), obtaining and applying atop the intermediary coating fine particles of a material to which the extruded material will be able to bond during the build, and conditioning the intermediary coating to firmly hold the fine particles.

In an example consistent with the present teachings, it has been demonstrated that where a high-temperature plastic such as PEI is to be extruded—necessitating a heated enclosure 110 and a metal build plate 130—first layer attachment is dramatically enhanced by coating the surface of the build plate with a layer of initially tacky yet hardenable intermediary coating which is then used to fix in place fine particles made of either the same material to printed or of a compatible alternative material exhibiting similar cohesion and temperature tolerance. It is considered preferable that the intermediary coating not engulf or encapsulate the fine particles. Initial layer adhesion is achieved by cohesion among like materials, so subsequently extruded materials will preferably make direct contact with the anchored particles, unadulterated by a film of coating material. At least in this aspect, the use of an intermediary coating represents a departure from conventional practice and its role is not duplicable by an adhesive, slurry or paste—even those that include the material that is to be extruded.

For example, when one prepares a paste-like mixture of particles and binder, the particles tend to be immersed in and surrounded by the binding agent, meaning that the resulting outward surface is predominantly binder. If the binder itself offers very little adhesion to the material being extruded after drying or hardening, especially at escalated temperatures of a heated build surface, then the coating will fail to facilitate first layer adhesion.

In contrast, for a surface coating prepared in accordance with preferred embodiments of the present teachings, an initial layer of extruded material is able to make contact directly with a bond-compatible material without interference from an interposed layer of foreign material, such as a binder. As stated before, the bond-compatible material may be of substantially the same material that is to be extruded or may be of a similar material that adheres by fusion, interdiffusion or entanglement as heated extrusion makes contact.

As used herein, the term 'bondable particulate material' (or equivalently 'extrudate-bondable particulate material') refers to a material, provided in the form of fine particles, to which a given extruded material can bond as it is discharged from an extrusion nozzle. (Note that the 'bondable' aspect is with respect to the extruded material and is not necessarily related to or indicative of bonding with the intermediary coating. For reasons explained herein, those affinities could differ considerably.) With respect to a selected material to be extruded, such as PEI, one candidate for a bondable particulate material to help form a receptive build surface would be ground PEI itself, wherein the ability to form a bond is assured by cohesion. Other materials may provide an acceptable degree of bonding upon contact with PEI being extruded from a nozzle and may serve as the bondable particulate material if they can be rendered as fine particles, preferably with surface irregularities that promote fixation by the intermediary coating. The bondable attribute may also be a function of particle shape and the texturing imparted to the build plate surface by the fine particles. Under the right conditions, an extruded material may partially surround or ensnare some of the affixed fine particles, facilitating the grip of the initial extrusion layer onto the build plate. Although PEI and PEEK have already been mentioned as desirable, but challenging, materials with which to print, it should be made clear that these are merely examples. Printing of other classes of polymers may similarly benefit by the present teachings. These classes include at least polyketones, polyetherketones, polyetheretherketones and polyetherketoneketones. These may serve as either the material to be extruded, the bondable particulate material or both. The bondable particulate material may comprise a mixture of particles of different substances. Furthermore, the different substances may offer different bond strength to the extruded material and the proportioning of particles from the different substances may be used to adjust the macroscopic degree of bonding between the extruded material and the build surface.

A bondable particulate material may be prepared by abrading a fine-celled foam sheet of the material. This approach achieves useful particle size and shape, especially as to producing irregularities that can become mechanically anchored upon hardening of the intermediary coating. Alternatively, dust or fine powder may be formed from sanding away at a block, sheet, rod or filament made of the material or by vibratory abrading among pellets. It is contemplated that, for some materials, formation of fine particles may advantageously be performed under cryogenic conditions leading to brittleness and jagged surface features in materials, like polyolefins, which are normally somewhat waxy or stringy at normal temperatures. Cryogenic conditions reduce the tendency for abraded particles to heat enough to locally soften and form a bead or glazed surface.

As for the intermediary coating, the present teachings encompass a range of possible substances and mixtures, which may be selectable—depending mainly on which material is to be extruded. Many of the possible substances that may be suitable for use according to the present teachings are not generally classified as 'adhesives' or may, in the present context, rely on a different operating principle than typical adhesives. The recommended intermediary coating achieves initial attachment of fine particulate materials on contact, exhibits non-encapsulating behavior after contact and then increases firmness to anchor the particles in place. Adhesives often work on a principle of electrostatic attraction such as hydrogen bonding, Van der Waals forces or the like. These forces are presumed to persist as the principal binding force throughout the time that bonded items remain in contact. In contrast, some coating materials contemplated by the present teachings may not rely on such effects and, in some cases taught herein, any initial attractions may fully subside as the recommended intermediary coating material undergoes hardening or any other significant physical or chemical changes in preparation for or during extrusion of materials onto the build surface. To be clear, however, that is not to say that all materials conventionally used as adhesives are strictly precluded from use as an intermediary coating. It is conceivable that, with some compositions or formulations, the intermediary coating may in fact adhere somewhat to the bondable particulate material but not to the extruded material. The degree of adhesion to the bondable particulate material may increase or decrease upon conditioning of the intermediary coating as described elsewhere herein.

In accordance with a preferred embodiment of the present teachings, the intermediary coating is a solution comprising sugar (sucrose) dissolved in water at a concentration that can be distributed thinly and evenly over the build plate surface. The consistency is preferably comparable to a medium to thick simple syrup corresponding a ratio of between 1:2 to 1:1 sucrose to water by volume. The consistency should preferably allow for spraying a thin coat (roughly 1 mm thick or less) onto the build plate surface without running or sagging. Spray application onto a roughly vertical works satisfactorily, but other means of application are contemplated such as spin coating, brushing, dipping, screeding or screen printing.

A surfactant such as common dish or bar soap (saponified long chain fatty acids) may be added in minute quantities to facilitate even coating of the build plate surface without beading away. Surfactants may also include ionic surfactants. Surfactants may or may not influence attractive forces or wetting behavior between the intermediary coating and the fine particles. While improved wetting may prove beneficial with some combinations of materials, it may not always be achievable and is not considered essential to all possible implementations of the present teachings.

The sugar solution offers some stickiness, at least initially, so that in the next step of processing the fine particles are apt to stay in place once they have made contact. To improve the likelihood of fine particles being affixed yet not engulfed, it may be useful to control either, or both of, the thickness of the coating (preferably thinner) in relation to the size of the particles or the concentration of the intermediary coating solution.

Serving as an intermediary coating, the prescribed sugar solution preferably remains sticky for a brief time, depending on ambient temperature and humidity. Introduction of the bondable particulate material (as further described below) preferably proceeds soon after application of the intermediary coating to the build surface. In practice, one factor in choosing a suitable sugar concentration relates to sustaining tackiness long enough to carry out this so-called 'dusting' process which follows.

Once a bondable particulate material has been selected and/or prepared, it applied atop the intermediary coating by first placing the build plate in a nearly vertical position but inclined back by some 10 to 20 degrees in a direction such that the intermediary coating is accessible from above. The fine particulate or powder is carefully introduced to the surface of the intermediary coating by releasing small amounts of the powder from above and near the top of the build plate, allowing the articles to cascade down the surface under the influence of gravity. This is further explained later in conjunction with FIG. 4.

In final preparation for use as a build surface, the composite structure comprising the build plate, intermediary coating and fine particles may optionally or incidentally undergo conditioning to more rigidly fix in place any particles retained on the intermediary coating. This conditioning may simply amount to allowing the intermediary coating to dry or thicken with time. This conditioning may involve raising the temperature of the build plate using integral heating elements or by placing into an oven or in the heated enclosure of a printer where it will be used. Some conditioning may occur as printing commences or just before printing, within the timeframe that the various heated parts of the printer are stabilizing at the target temperatures that will be used for printing. In other words, conditioning of the intermediary layer may occur incidentally as the printer is otherwise being prepared to initiate a print.

If one were to measure a force required to detach fine particles that have become affixed to the intermediary coating, the conditioning process should preferably result in a significant increase in the removal force required—regardless of whether surface-surface adhesion between the intermediary coating and the bondable particulate material increases or decreases with conditioning. As described elsewhere herein, the expected mechanism that explains the increased force of attachment involves the intermediary coating stiffening around features of the fine particles.

Over time and with elevated temperature (or by exposure to a catalyst, a chemical activator or photonic excitation) and depending on its specific formulation, the intermediary coating may undergo one or more of the following changes: concentration of solute by evaporation of solvent, drying, hardening, fusing, crystallization, saturation, carbonization, caramelization, pyrolysis, polymerization, intermolecular bonding or intertwining, formation of disulfide linkages, condensation reactions, formation or change in structure of a polypeptide structure. Depending on a given set of circumstances, some of these changes may be important to the mechanism of securing the fine particles within the coating or may be inconsequential. The intermediary coating may undergo chemical reactions, physical changes or simply become dry and caked on. By the time extrusion onto the build surface is underway, the intermediary coating may have increased in density or firmness in comparison to when it was first applied or when the fine particles were layered on. The intermediary may form a hardened matrix to secure some portion of each fine particle's surface, without fully engulfing the particles. As mentioned before, the particles preferably have irregular topologies or surface features that tend to become captive as the intermediary coating becomes firm. It is important to note that whatever degree of attachment that may have existed when the fine particles were applied to the intermediary layer may increase or totally subside as the intermediary coating becomes firm. By the time extrusion onto the build surface is underway, the primary means of holding fine particles in place may shift to mechanical entrapment rather than adhesion.

This mechanism is best explained with reference to FIGS. 2A-2E of the accompanying drawings.

Figure 2A:
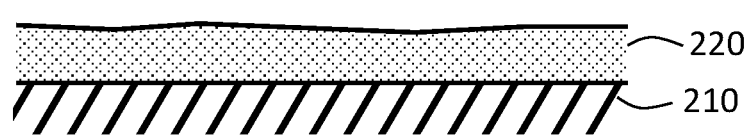
FIGS. 2A-2E are conceptual sketches depicting the progressive addition of an intermediary coating, bondable particulate material and extruded material to a build plate surface in accordance with a preferred embodiment of the present teachings.

FIG. 2A it a conceptual sketch (and not drawn to scale) depicting a build plate 130 after an intermediary coating 220 has been applied to its surface. In FIGS. 2A-2E, build plate 130 shall be depicted as substrate 210 upon which extruded materials are desired to be cumulatively applied.

Figure 2B:
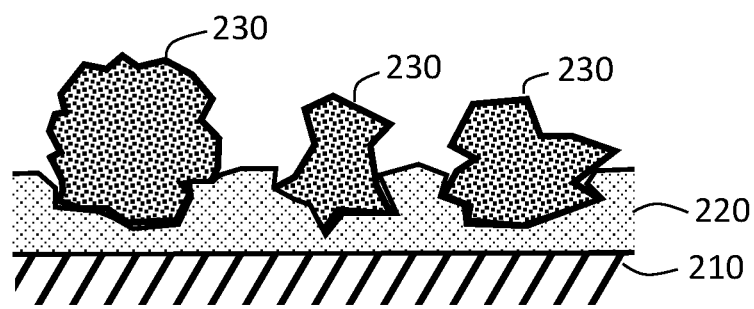

FIG. 2B depicts the surface of build plate 130 after fine particles 230 of a selected material have been brought in contact with intermediary coating 220. The degree of contact or embedding shown is merely for explanation and may vary considerably among different compositions. The relative thickness of intermediary coating 220 to the size of particles 230 are not necessarily the same as depicted here and may vary according to how one prepares and applies the coating and prepares the fine particles.

In FIG. 2B it is evident that particles 230 have some degree of contact and immersion with intermediary coating 220. Intermediary coating 220 is shown with a first pattern of crosshatching to indicate that its state of concentration or hardening is substantially the same as when it was applied. As particles 230 were introduced to the surface of intermediary coating 220, coating 220 may have been very soft or gel-like, allowing for some mild embedment by particles 230.

Figure 2C:
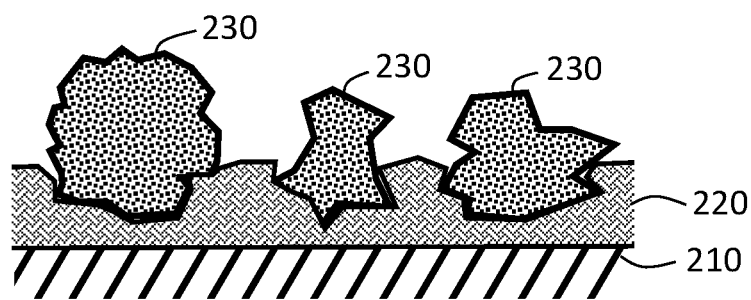

In FIG. 2C, intermediary coating 220 has undergone conditioning of some nature to more rigidly fix particles 230, as graphically indicated by a second crosshatch pattern.

Conditioning of intermediary coating 220 may involve any combination of physical or chemical changes mentioned previously, such as drying, hardening, crystallizing or polymerizing, to name a few. Although not clearly depicted here, conditioning of coating 220 may be accompanied by some shrinkage if the principal effect is by drying.

Figure 2D:
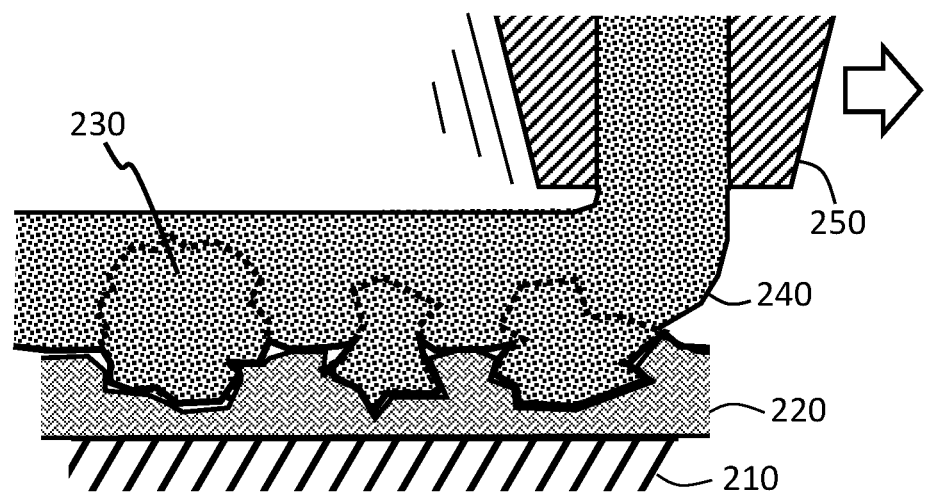

FIG. 2D depicts extruding an initial layer of material, such as a thermoplastic, onto the prepared surface comprising both intermediary coating 220 and particles 230. A stream of extruded material 240 is seen to be discharged from a moving nozzle 250 (not drawn to scale—particle sizes may be exaggerated). As the softened or substantially molten material 240 is extruded under heat and pressure from nozzle 250, it contacts and bonds with affixed particles 230. This bond involves fusion and cohesion among identical or similar materials. To some extent, extruded material 240 may partially engulf particles 230 depending on conditions dimensions. In other situations, particles 230 may more densely cover over intermediary coating 220—that is, more densely than depicted in FIG. 2D. Extruded material 240 may only touch and bond with the 'tops' of particles 230, still yielding sufficient attachment of the initial layer of extruded material 240 and of the remainder of the build layers. Extruded material 240 need not contact, achieve a bond with or exhibit significant adhesion or cohesion strength with respect to intermediary coating 220.

Figure 2E:
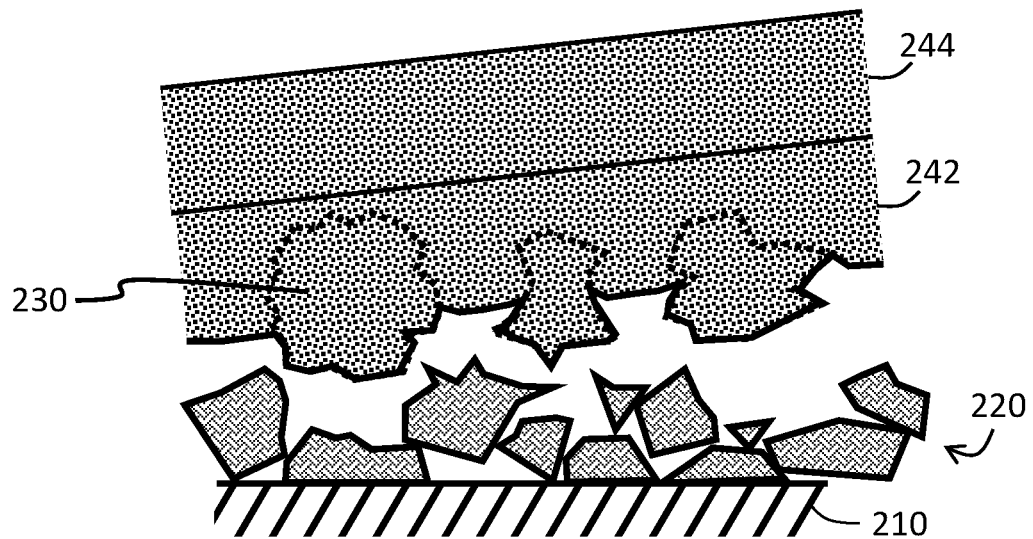

FIG. 2E shows one way in which a completed workpiece, comprising initial layer of extruded material 242 and any number of subsequent layers 244, are separated from the build plate 130. In this conceptual drawing, particles 230 appear to remain attached to, or embedded in, extruded material 242. In this case, intermediary coating 220 is shown to relinquish its attachment by breaking apart, as might be the case when the conditioning of the intermediary coating results in a hard, brittle layer, such as by crystallizing. As a possible additional advantage, proper selection and application of an intermediary coating may achieve consistency in force required for mechanical part removal. As an alternative to brittleness, intermediary coating 220 might retain some pliability and particles 220 may forcefully pulled away, leaving concavities in the coating. As yet another possibility, particles 230 may only contact extruded material 242 very superficially and be held more strongly by intermediary coating 220. Under these conditions, some or all of particles 230 may remain attached to the build plate as the completed workpiece is removed. As mentioned before, the intermediary coating might even be softened or dissolved in place, for example, by treatment with water or other solvent, by attack of a chemical reagent (acidic or basic) or by enzymatic activity. Regardless of which of these modes of separation occurs, the combination of the intermediary coating 220 and fine particles 230 will have accomplished successful initiation of extrusion onto the build plate and provided for separability upon completion of the build.

Figure 3:
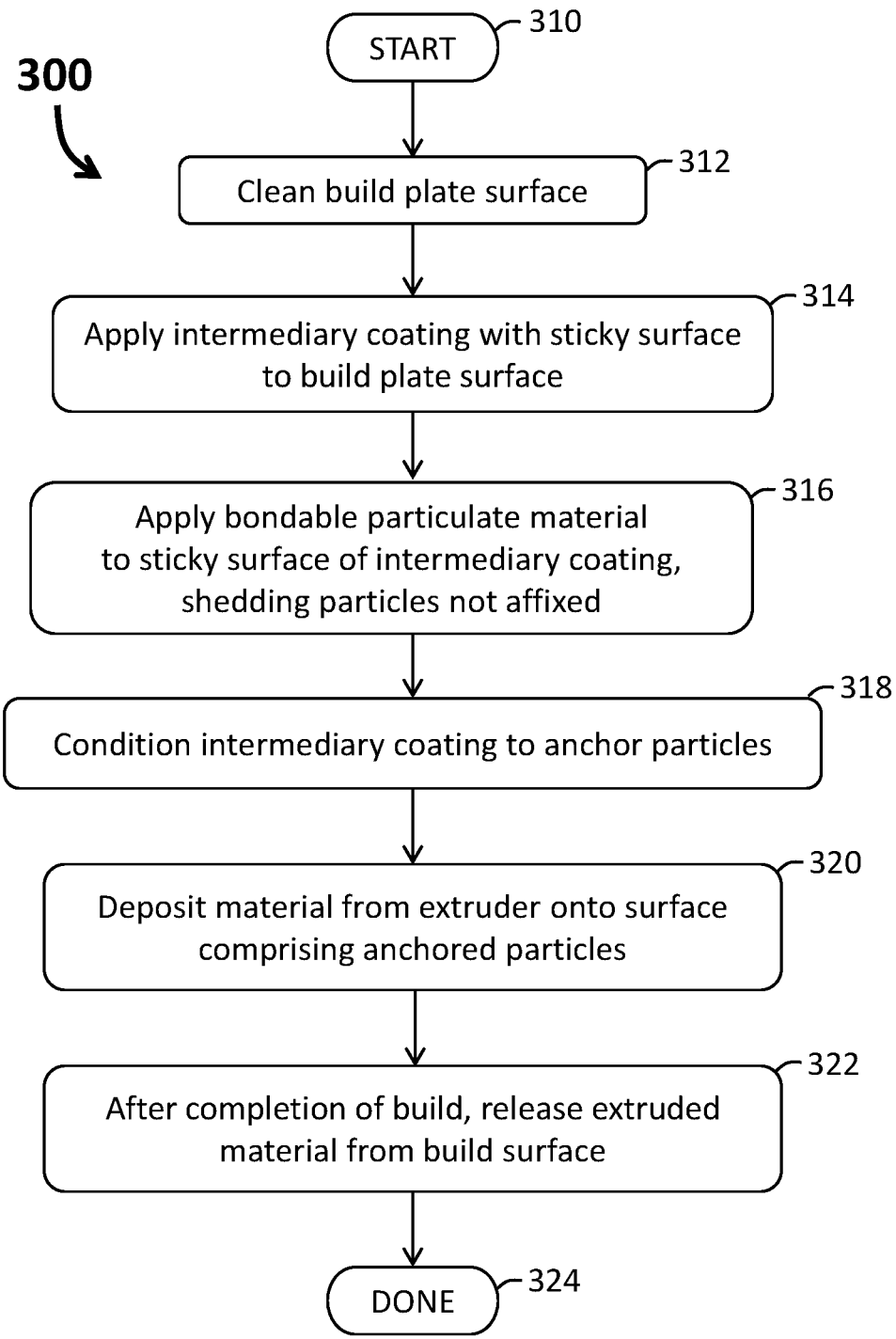
FIG. 3 is a high-level flowchart describing an example process for preparing a build plate surface in accordance with a preferred embodiment of the present teachings.

To summarize a process that comports with the present teachings, FIG. 3 describes a process 300 for preparing a build surface in accordance with an exemplary embodiment. Process 300 commences in step 310, generally upon the providing of the build that will be used for and in the context of a selected material that will be extruded onto the build surface to form an object.

Step 310 also corresponds to the preparatory step of obtaining (or preparing as described above) an intermediary coating solution and a suitable fine particulate form of either the selected material or of a similar material that will fuse or provide ample cohesion with the selected material.

Undertaken next, step 312 involves cleaning the build plate surface that is to receive the intermediary coating. This may involve mechanical steps (scrubbing, scraping) and chemical steps to clean the surface of dirt and debris, especially if residue of intermediary coating remains from a previous build cycle. This step may also include application of cleaning agents, etchants, surfactants, wetting agents, surface activators (such as quaternary amines), catalysts, acids or bases that improve the tendency for the intermediary coating in the next step to evenly coat the bare surface of the build plate. For the example intermediary coating taught herein, no extraordinary chemical processes have been needed or shown to be advantageous. Nevertheless, as acknowledged elsewhere herein, many other intermediary coating formulations are possible and may benefit by involving one or more of these agents during cleaning step 312.

Next, in step 314, the intermediary coating is applied to the surface of the build plate. One satisfactory technique involves setting the build plate in a substantially vertical position (meaning that the plane of the flat build surface is perpendicular to the direction of gravity) and then spraying the intermediary coating solution, such as by a handheld pump sprayer, aerosol sprayer, airbrush or an electric or pneumatic paint sprayer. As stated before, the consistency of the solution should permit spraying an even coat and yet the coating should not tend to run or sag so long as it is applied evenly and sparingly. The surface of the coating should remain sticky for time, at least long enough for step 316 to be performed effectively.

Figure 4:
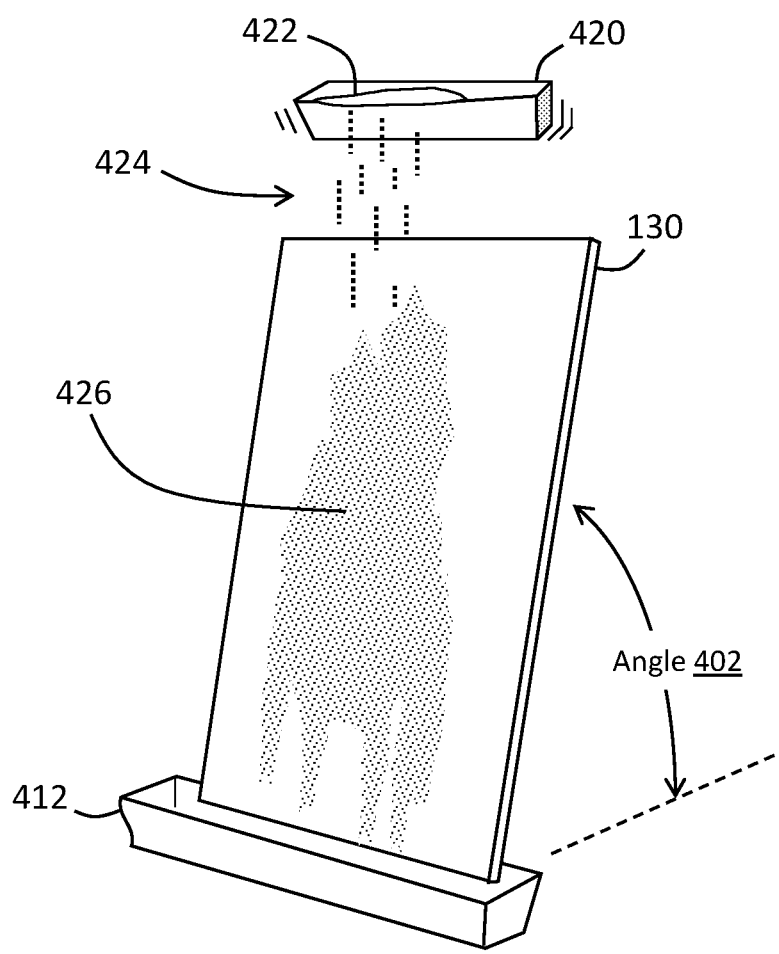
FIG. 4 is a pictorial showing a manner of applying bondable particulate material to a build plate onto which an intermediary coating has been applied in accordance with a preferred embodiment of the present teachings.

In step 316, the build plate, including the sticky intermediary coating applied in step 314, is preferably positioned and treated as shown in FIG. 4.

Briefly referencing FIG. 4, build plate 130 is shown to be canted back to an angle 402, in this case equal to around 70 degrees relative to horizontal, in preparation for applying the fine particles. Angle 402 may be varied to achieve desired operation. The build plate may be clamped, mounted or just resting on edge and leaning against a stationary object but, for simplicity, these modalities are not explicitly shown in FIG. 4.

A container 420, holding some amount of bondable particulate material 422, is shown to be held above tilted build plate 130.

As mentioned previously, bondable particulate material 422 will generally be of the same or a similar material that will later be extruded onto the build plate. Bondable particulate material 422 may have been prepared by abrading a solid block or foam block of the selected material.

Gentle tilting, agitating or sifting may take place at container 420 to cause a light stream of particles 424 to fall from container 420 onto the intermediary coating that is already present on build plate 130.

The stream of released particles 424 land on build plate 130 and cascade down its steeply inclined surface. This will form areas of saturated coverage 426 where fine particles have become affixed on the surface of the intermediary coating—so densely that there is no remaining space for other particles to come in contact with the coating. Particles of the bondable particulate material falling across the surface of the build plate will either reach a point on the intermediary coating and become affixed or fall off the end of the build plate. Some falling particles may be held up by other particles that have become affixed and may fail to make appreciable direct contact with the intermediary coating. It is considered preferable to remove these excess particles as these particles will not contribute to achieving the desired 'bond-by-proxy' effect as taught herein. After the prescribed uniform coverage particles have attached to the coating, any excess particles that have not become affixed are preferably drawn away by gravity in combination with mildly striking, tapping or vibrating the build plate. Around the bottom of build plate 130 is placed a collecting bin 412, or the like, for catching any of these excess particles that fall onto the build plate surface without becoming affixed.

Although techniques like blowing compressed air or vacuuming may also be effective, excessive use of these measures can cause undesirable dispersal of the fine particles which can settle into machinery or create a hazard for personnel. Use of blown air also risks dislodging particles, disturbing the intermediary coating or causing particles to become overcoated.

In some implementations, it may be useful to apply an electrostatic charge to build plate 130 relative to container 420 to draw fine particles into contact with the intermediary coating.

As some particles become attached, it is possible they may cause a shadowing effect for other particles falling over the surface. To counteract this, this application of bondable particulate material is preferably repeated with the build plate rotated to different orientations. In the case of a rectangular build plate, for example, the process may involve setting the plate on one edge for one dusting pass, then turning it 180 degrees to rest on the opposite edge and then repeating the dusting process to assure thorough coverage.

Returning to FIG. 3, then, step 316 corresponds to applying the bondable particulate material and removing any particles that have not become fixed in place on the intermediary coating.

Step 318 involves processes needed, if any, to condition the intermediary coating to keep the bondable particulate material in place. In the example of a tacky sucrose solution serving as the intermediary coating, this may involve drying or baking to cause further solidification or hardening of the coating. In some applications, sufficient hardening of the coating may occur incidentally as the build plate and possibly a heated enclosure surrounding it are brought to elevated temperatures in preparation for extrusion deposition to commence.

Step 320 corresponds to depositing extruded material onto the prepared build surface in the course of building a part using extrusion deposition modeling.

After completion of the build process, in step 322, the finished object or workpiece that has been formed on the build plate by layers of extruded material is released from the build plate. After this removal, process 300 concludes as indicated by step 324. One method of releasing the object may involve applying sufficient forces to the object to disrupt the intermediary coating—which may include tensile forces (pulling outward away from the plate), shearing forces (pushing sideways) or peeling forces (by driving wedges between the object and build plate or by flexing the build plate.) FIG. 2E, explained earlier, depicted the result of breaking the object way from a brittle implementation of the intermediary coating. In conjunction with FIG. 2E, other mechanisms for releasing the object were described to include softening or dissolving of the intermediary coating.

While the sugar solution as described above by way of example has proven useful for extruding PEI onto a steel build plate at high temperatures, it is worth clarifying that this is just one form of intermediary coating and that many other compositions may be used, especially in the context of alternative extruded materials.

Considered more broadly, the intermediary coating may, for example, be selected from a wide range of carbohydrates and/or proteins, which have a tendency to exhibit some stickiness in concentrated solution and the ability, by one mechanism or another, to increase firmness after being deposited as a coating on a build plate. These qualities lend to the ability to affix and anchor bondable particulate material to a build plate.

Useful carbohydrates in this context may include, but are not limited to, mono-, di-saccharides and poly-saccharides, generally characterized as hydrophilic organic molecules having one or more cyclic structures and a plurality of hydroxyl substituents. Concentrated aqueous solutions of these harden substantially while often remaining amorphous. Some examples include sucrose (common table sugar) dextrose, lactose, maltose, fructose, etc. may be of natural or synthetic origin. Other potentially useful carbohydrates include starch, glycogen, cellulose, locust bean gum, guar gum, microcrystalline cellulose, methylcellulose and derivatives thereof.

Alternatively, some protein-bases structures may exhibit comparable solubility and adhesion, though depending on peptide sequence these substances may not exhibit high temperatures stability offered by sugars. Gluten, gliadin and glutenin would be some examples. Protein molecules add a variety of changes that might occur during conditioning, such as formation or changing of peptide linkages or disulfide cross linkages, changes in conformation, denaturing and other formation of, or alteration to, secondary, tertiary or quaternary structure. Protein-based structures also raise the possibility of part release and cleanup using enzymatic activity.

Yet other systems of intermediary coating are possible based on a methanol solution of silica/glycerol/2,4,7,9-tetramethyldec-5-yne-4,7-diol or on photopolymers such as cinnamyl alcohol-based materials.

In the foregoing description numerous exemplary embodiments were presented and described, with reference to possible variations. Nevertheless, it is worth reiterating that the embodiments and variations described were merely illustrative, that still other variations are possible and that the scope of the invention sought to be covered is not defined or limited by the particular instances described herein but rather by the appended claims that follow.

What is claimed is:

1. A process, in an extrusion deposition modeling system, for preparing and using a surface of a build plate to provide a bondable surface to a first material to be deposited onto the build plate by extrusion, the process comprising:
    applying, in a first application to the surface of the build plate, an intermediary coating as a flowable liquid, wherein the intermediary coating is formulated to substantially adhere to the build plate, to become more rigid after application to the build plate and to maintain rigidity when heated to a target temperature that is above 120° C.;
    in a second application to the surface of the build plate, subsequent to the first application, applying to the intermediary coating a bondable particulate material comprising fine particles of a second material in solid form, wherein at least some of the bondable particulate material becomes affixed onto the intermediary coating without being fully engulfed by the intermediary coating, leaving the second material partially exposed;
    heating the build plate to a target tem that is above 120° C.;
    depositing, by extrusion, the first material onto the bondable particulate material in the course of constructing a solid object made from the first material and supported by the build plate, wherein the deposited first material makes direct contact with the second material and wherein at least a portion of the depositing occurs while the build plate is above 120° C. and wherein the intermediary coating rigidly affixes the bondable particulate material in a fixed position relative to the build plate while the build plate is at a target temperature that is above 120° C.;
    detaching the solid object from the build plate by destruction of the intermediary coating, wherein at least a portion of the bondable particulate material remains attached to the solid object after destruction of the intermediary coating; and
    cleaning the build plate by removing remnants of the intermediary coating from the build plate.

2. The process of claim 1 wherein the bondable particulate material is of substantially the same composition as the first material.

3. The process of claim 1 wherein the bondable particulate material is a substance to which the first material bonds as the first material is extruded.

4. The process of claim 1 wherein the first material does not bond directly to the intermediary coating.

5. The process of claim 1 wherein the bondable particulate material becomes affixed to the intermediary coating such that a first amount of force is required to detach the fine particles from the intermediary coating, and further comprising the step of:
    performing a conditioning process on the intermediary coating such that a second amount of force, greater than the first amount of force, is required to detach the fine particles during or after the conditioning process.

6. The process of claim 5 wherein the conditioning process further comprises one or more of the following actions upon the intermediary coating: heating, drying, condensing, crosslinking, polymerizing, crystallizing, catalysis, or photonic excitation.

7. The process of claim 6 wherein the conditioning process involves raising the temperature of the intermediary coating to above 120° C.

8. The process of claim 1 wherein the intermediary coating further comprises a carbohydrate substance dissolved in a polar solvent.

9. The process of claim 8 wherein the intermediary coating further comprises a solution made of sucrose dissolved in water.

10. The process of claim 1 wherein the first material is polyetherimide.

11. The process of claim 1 wherein the first material further comprises one or more polymers selected from the group consisting of polyketone, polyetherketone, polyetheretherketone and polyetherketoneketone.

12. The process of claim 1 wherein the first material is insoluble in at least one ketone group solvent.

13. The process of claim 1 wherein the first material has a glass transition temperature above 200° C.

14. The process of claim 1 wherein said bondable particulate material comprises a polymer material that does not adhere to the build plate.

15. The process of claim 1 wherein the surface of the build plate further comprises a metallic surface and the first material does not adhere to the metallic surface directly.

16. The process of claim 15 wherein the metallic surface further comprises iron.

17. The process of claim 1 wherein the intermediary coating contains at least one protein.

18. The process of claim 1 wherein the first material, while being deposited by extrusion, partially engulfs the exposed portions of the fine particles of the bondable particulate material.

* * * * *